(12) United States Patent
Seng et al.

(10) Patent No.: US 7,817,364 B2
(45) Date of Patent: Oct. 19, 2010

(54) DEFECT REALLOCATION FOR DATA TRACKS HAVING LARGE SECTOR SIZE

(75) Inventors: Edmun ChianSong Seng, Singapore (SG); AikChuan Lim, Singapore (SG); Stephen KowChiew Kuan, Singapore (SG); UttHeng Kan, Singapore (SG); Lin Nah Lim, Singapore (SG); Det Hau Wu, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 1138 days.

(21) Appl. No.: 11/405,886

(22) Filed: Apr. 18, 2006

(65) Prior Publication Data
US 2007/0242379 A1 Oct. 18, 2007

(51) Int. Cl.
*G11B 5/09* (2006.01)
(52) U.S. Cl. .............................. 360/48; 360/31; 360/53; 360/77.02
(58) Field of Classification Search .................. None
See application file for complete search history.

(56) References Cited

U.S. PATENT DOCUMENTS

| | | | |
|---|---|---|---|
| 4,924,331 A * | 5/1990 | Robinson et al. | 360/72.1 |
| 5,235,585 A * | 8/1993 | Bish et al. | 369/53.17 |
| 5,367,652 A * | 11/1994 | Golden et al. | 711/4 |
| 5,784,216 A * | 7/1998 | Zaharris | 360/48 |
| 5,812,755 A * | 9/1998 | Kool et al. | 714/8 |
| 5,844,911 A * | 12/1998 | Schadegg et al. | 714/710 |
| 6,034,831 A * | 3/2000 | Dobbek et al. | 360/53 |
| 6,043,945 A * | 3/2000 | Tsuboi et al. | 360/53 |
| 6,101,619 A * | 8/2000 | Shin | 714/710 |
| 6,263,459 B1 | 7/2001 | Schibilla | 714/710 |
| 6,279,089 B1 * | 8/2001 | Schibilla et al. | 711/162 |
| 6,442,715 B1 | 8/2002 | Wilson | 714/710 |
| 6,560,055 B1 * | 5/2003 | Nemazie et al. | 360/53 |
| 6,574,699 B1 * | 6/2003 | Dobbek | 711/4 |
| 6,728,899 B1 * | 4/2004 | Ng et al. | 714/8 |
| 6,738,924 B1 | 5/2004 | Williams et al. | 714/7 |
| 6,782,458 B1 | 8/2004 | Noble | 711/163 |
| 6,944,735 B2 | 9/2005 | Noble | 711/163 |
| 6,947,232 B2 * | 9/2005 | Lim et al. | 360/31 |
| 6,957,360 B2 * | 10/2005 | Sims et al. | 714/8 |
| 6,993,678 B2 * | 1/2006 | Cheok et al. | 714/8 |
| 7,143,309 B2 * | 11/2006 | Yoshida | 714/8 |
| 7,230,893 B2 * | 6/2007 | Park | 369/47.14 |
| 7,245,445 B2 * | 7/2007 | Lee | 360/48 |
| 2001/0042223 A1 * | 11/2001 | Hoskins | 714/8 |
| 2003/0237024 A1 * | 12/2003 | Ogawa et al. | 714/29 |
| 2004/0153845 A1 * | 8/2004 | Nam | 714/42 |
| 2004/0255079 A1 | 12/2004 | Noble | 711/112 |
| 2005/0097406 A1 * | 5/2005 | Brebisson | 714/52 |
| 2005/0122610 A1 | 6/2005 | Ehrlich | 360/55 |

(Continued)

*Primary Examiner*—Dismery E Mercedes
(74) *Attorney, Agent, or Firm*—Leanne Taveggia Farrell; Westman, Champlin & Kelly, P. A.

(57) ABSTRACT

A method is provided. The method includes determining that a data sector included in a select data track is in error, the data sector in error includes at least one identified data wedge. The at least one defective data wedge in the data sector in error is located. The method also includes moving the at least one defective data wedge by utilizing at least one spare wedge on the select data track.

16 Claims, 8 Drawing Sheets

U.S. PATENT DOCUMENTS

| | | |
|---|---|---|
| 2005/0125600 A1 | 6/2005 | Ehrlich ........................ 711/112 |
| 2005/0125601 A1 | 6/2005 | Ehrlich ........................ 711/112 |
| 2005/0125602 A1 | 6/2005 | Ehrlich ........................ 711/112 |
| 2005/0125603 A1 | 6/2005 | Ehrlich ........................ 711/112 |
| 2005/0149827 A1 | 7/2005 | Lambert et al. ............. 714/770 |
| 2005/0216772 A1 | 9/2005 | Noble ......................... 713/201 |

* cited by examiner

DEFECT REALLOCATION FOR DATA TRACKS HAVING LARGE SECTOR SIZE

FIELD OF THE INVENTION

The present invention relates generally to data storage systems. In particular, the present invention relates to a storage medium of a data storage system.

BACKGROUND OF THE INVENTION

Data storage systems, such as disc drives, typically store information on surfaces of storage media such as magnetic or optical discs. In a typical disc drive, one or more discs are mounted together on a spindle. The spindle causes the disc(s) to spin and the data surfaces of the disc(s) to pass under respective hydrodynamic and aerodynamic bearing sliders. Each slider is typically mounted on an actuator arm that moves over each disc surface.

When information is stored on a disc it is generally stored in a set of concentric data tracks. The tracks on the disc surface are typically divided into data sectors. Data sectors are the basic units of data storage on a disc surface. A sector is a "pie-shaped" angular section of a track that is bounded on two sides by radii of the disc and on the other side by the perimeter of the circle that defines the track. In other words, the data sector is a storage segment along the length of a track. Generally, a certain number of spare data sectors are included in the storage medium. These spare data sectors may be utilized as replacement sectors for defective data sectors.

Some defective data sectors are formed at the time of disc manufacture. However, defects can arise in any of the data sectors at various times during the lifetime of the storage system (grown defects). Grown defects include, for example, invading foreign particles which become embedded onto the surface of the disc, or external shocks to the storage system which can cause the transducer to nick or crash onto the surface of the disc. Defective data sectors pose either temporary or permanent data retrieval problems.

Read errors are typically determined when the host computer attempts to retrieve user data from a data sector and one or more uncorrected errors exist. In general, each data sector includes data and some sort of error correction for correcting the data in the data sector. In addition, typically, the data storage system includes internally programmed error recovery routines such that upon determination of a read error, the data storage system applies a variety of corrective operations to recover user data. Occasionally, the data storage system exhausts all available corrective operations for recovery of data from a data sector without success. The data storage system will declare a hard error and reallocate the sector by mapping out the bad data sector and substituting an unused, spare sector. If the affected data track is allocated with spare data sectors, then the data storage system can also apply a slip operation to data sectors on a data track. Slipping is the process of moving the data in the bad data sector and all remaining data sectors that follow the bad data sector towards the spare sectors on the data track. The bad data sector is then marked as unusable.

Recently, there has been a rapid increase in the production of smaller disc drives in the disc drive industry. These smaller sized disc drives are for use with handheld or portable devices, such as cell phones, personal digital assistants and digital music players. In addition, overtime, data sector size has been continually increasing to provide greater detection of defective data and better correction of defective data in each data sector. For example, data sector size has increased from approximately 512 bytes per sector to a size of approximately 4,096 bytes per sector. A defect may only occur on a small portion of large sized data sectors. Having to reallocate an entire data sector because a portion of it is defective penalizes the rest of the perfectly good data in the data sector. In addition, finding available spare data sectors on smaller disc drives is difficult because of the limited amount of space available to reserve as spare data sectors.

Embodiments of the present invention provide solutions to these and other problems, and offer other advantages over the prior art.

SUMMARY OF THE INVENTION

The present invention includes a system that stores data in data wedges that occupy data sectors of a storage medium. The system includes processing circuitry that is configured to perform a method. It is determined that a data sector included in a select data track is in error. The data sector in error includes at least one identified data wedge. The at least one defective data wedge in the data sector in error is located. By utilizing at least one spare wedge on the select data track, the at least one defective data wedge is moved. In some embodiments, data is moved by scanning a data sector in a select data track for at least one defective data wedge and applying a slip on the select data track at a location of the at least one defective data wedge.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
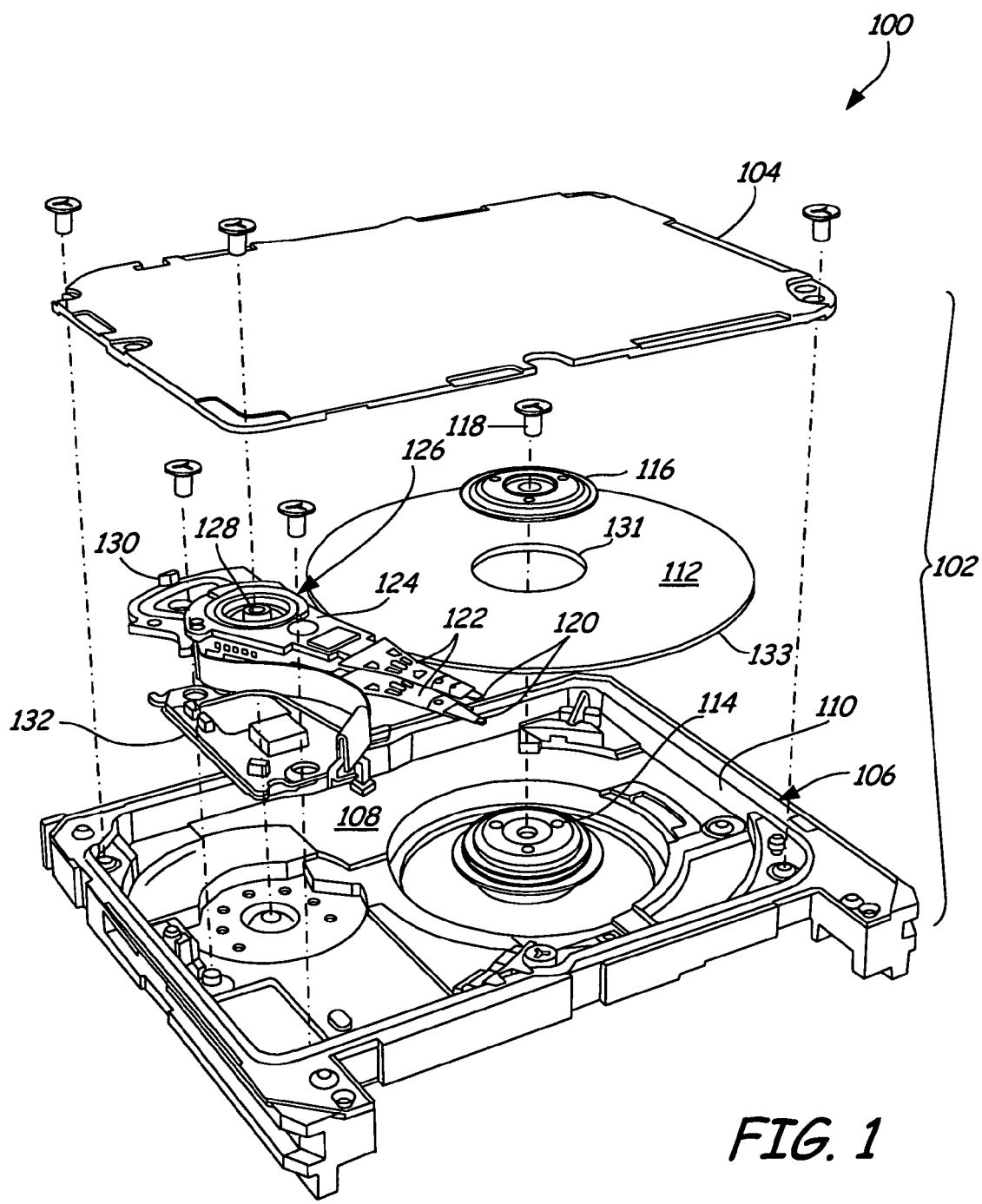
FIG. 1 is an exploded perspective view of a disc drive.

FIG. 1 is an exploded perspective view of a disc drive 100 in which embodiments of the present invention are useful.

Disc drives are common data storage systems. One or more embodiments of the present invention are also useful in other types of systems. Disc drive 100 is a small sized disc drive that can be used in connection with various types of handheld or portable devices, such as cell phones, personal digital assistants and digital music players.

Disc drive 100 includes a housing 102 having a cover 104 and a base 106. As shown, cover 104 attaches to base 106 to form an enclosure 108 enclosed by a perimeter wall 110 of base 106. The components of disc drive 100 are assembled to base 106 and are enclosed in enclosure 108 of housing 102. As shown, disc drive 100 includes a medium 112 which is a disc 113. Although FIG. 1 illustrates medium 112 as a single disc, those skilled in the art should understand that more than one disc can be used in disc drive 100. Medium 112 stores information in a plurality of circular, concentric data tracks and is mounted on a spindle motor assembly 114 by a disc clamp 116 and pin 118. Spindle motor assembly 114 rotates medium 112 causing its data surfaces to pass under respective hydrodynamic bearing slider surfaces. Each surface of medium 112 has an associated slider 120, which carries transducers that communicate with the surface of the medium.

In the example shown in FIG. 1, sliders 120 are supported by suspension assemblies 122, which are, in turn, attached to track accessing arms 124 of an actuator mechanism 126. Actuator mechanism 126 is rotated about a shaft 128 by a voice coil motor 130, which is controlled by servo control circuitry within internal circuit 132. Voice coil motor (VCM) 130 rotates actuator mechanism 126 to position sliders 120 relative to desired data tracks, between a disc inner diameter 131 and a disc outer diameter 133.

Figure 2:
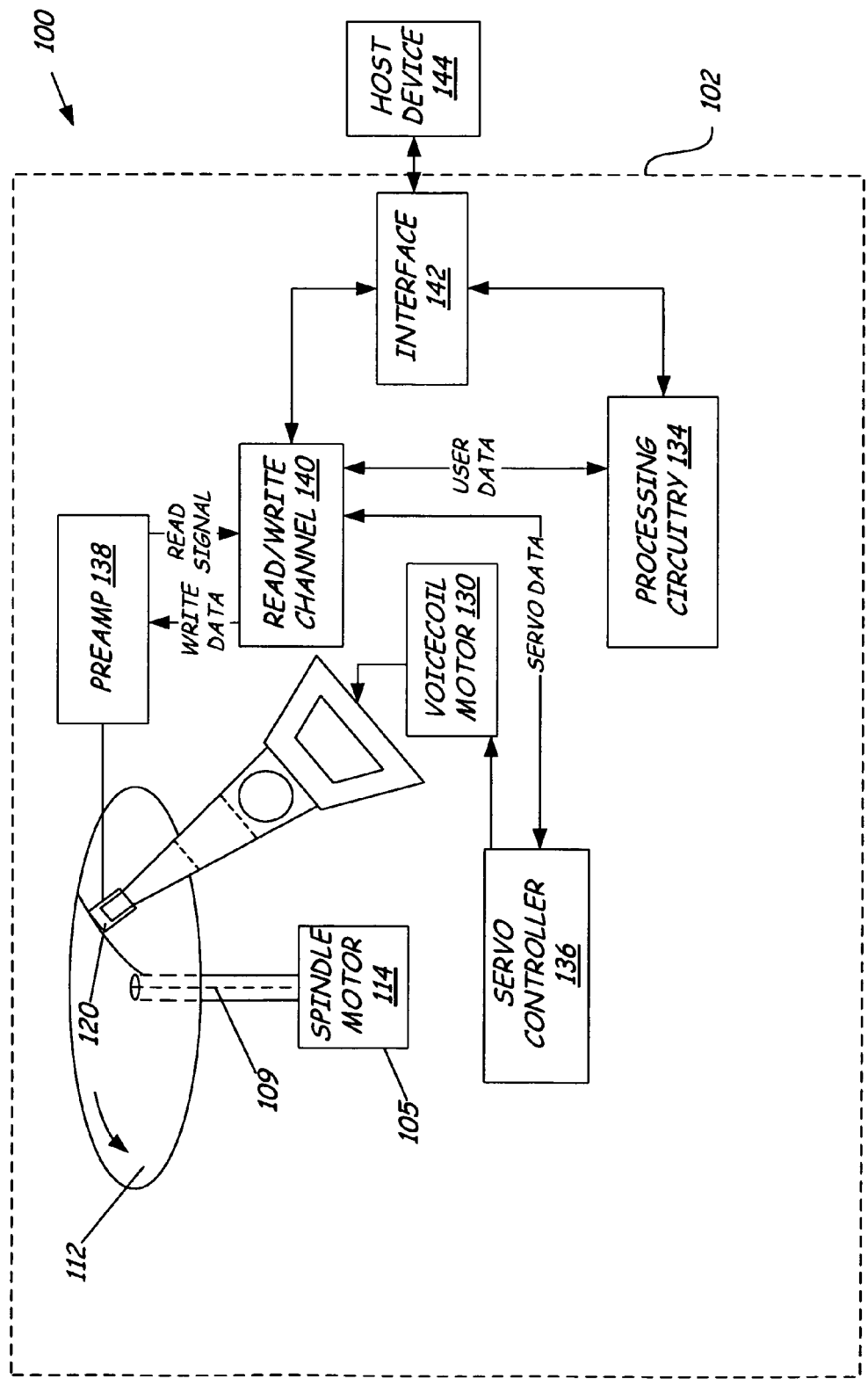
FIG. 2 is a simplified block diagram of the disc drive illustrated in FIG. 1.

FIG. 2 is a simplified block diagram of disc drive 100 illustrated in FIG. 1 having housing 102. Disc drive 100 includes processing circuitry 134, which is used for controlling certain operations of disc drive 100 in a known manner. In accordance with the present invention, processing circuitry 134 is also used for carrying out data recovery of flawed data and the reallocation or movement of flawed data. The various operations of disc drive 100 are controlled by processing circuitry 134 with the use of programming stored in a memory. Disc drive 100 also includes servo controller 136 which generates control signals applied to VCM 130 and spindle motor 114. Processing circuitry 134 instructs servo controller 136 to seek sliders 120 to desired tracks. Servo controller 136 is also responsive to servo data, such as servo burst information recorded on medium 112 or disc 113 in embedded servo fields or wedges included in the data tracks.

Disc drive 100 further includes a preamplifier (preamp) 138 for generating a write signal applied to sliders 120 during a write operation, and for amplifying a read signal emanating from slider 120 during a read operation. A read/write channel 140 receives data from processing circuitry 134 during a write operation, and provides encoded write data to preamplifier 138. During a read operation, read/write channel 140 processes a read signal generated by preamp 138 in order to detect and decode data recorded on medium 112. The decoded data is provided to processing circuitry 134 and ultimately through interface 142 to host device 144.

Figure 3:
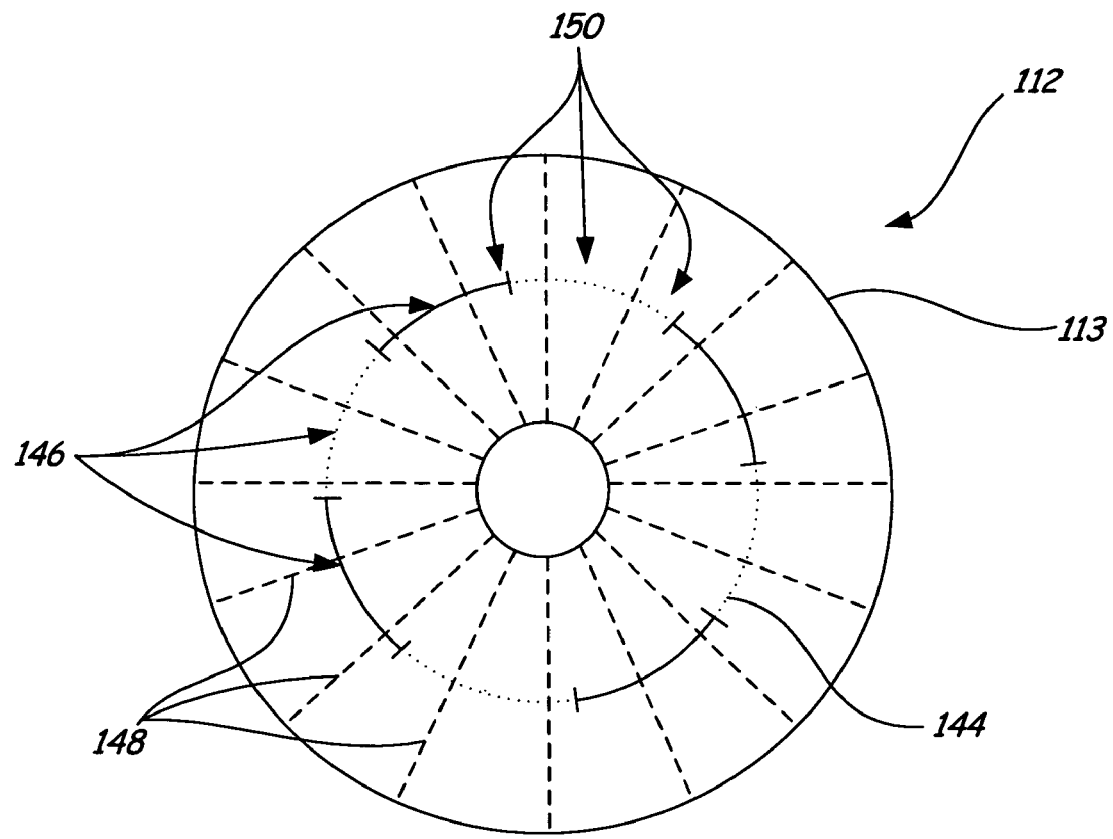
FIG. 3 illustrates a top plan view of the disc illustrated in FIGS. 1 and 2.
Figure 4:
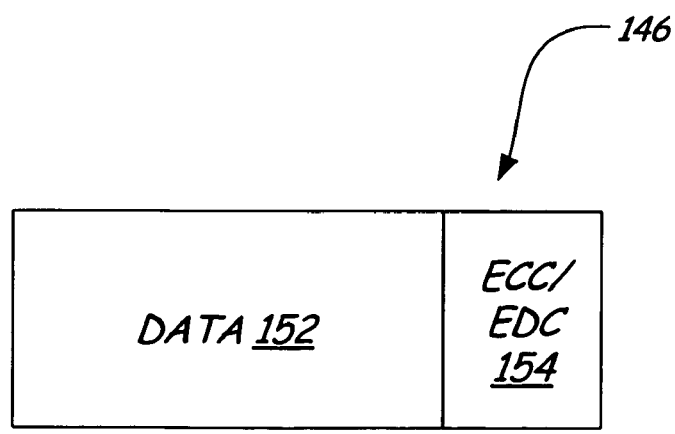
FIG. 4 illustrates a simplified diagram of one of the data sectors illustrated in FIG. 3.

FIG. 3 illustrates a top plan view of disc or medium 112 illustrated in FIGS. 1 and 2. Medium 112 is a small sized disc such that it can be used in connection with the small sized disc drive 100 of FIG. 1. Medium 112 has a plurality of substantially concentric circular tracks of which data track 144 is illustrated in FIG. 3. Each track including data track 114 is subdivided into a plurality of data sectors 146 (illustrated as either solid segments or dotted segments of track 144). Data sectors 146 are the basic unit of data storage in medium 112 and include "pie-shaped" angular sections of a track that are bounded on two sides by radii of the disc and on the other side by the perimeter of the circle that defines the track. Each data sector 146 is identified and located at various positions on medium 112. Data sectors located at various positions on medium 112 have a large size. For example, the data sector size can be as large as 4,096 bytes per data sector 146. FIG. 4 illustrates a simplified diagram of one of the data sectors 146 illustrated in FIG. 3. Each data sector 146 includes user data or data 152 and error correction data 154. Error correction data is often referred to as error correction code (ECC) or error detection code (EDC). ECC and EDC store error correction operations. The error correction operations can be applied to data 152 to recover data that has uncorrected errors.

Each track 144 also contains a plurality of servo wedges 148 and a plurality of data wedges 150. Each servo wedge 148 includes positioning information that is pre-written onto disc 113 such that the sliders on the suspension can easily locate data. In between each servo wedge 148 is a data wedge 150. Data wedges 150 include available area for writing user data. Since each data sector 146 has a large size (i.e. as much as 4,096 bytes per data sector), the data sectors 146 are unable to fit into a single data wedge 150 (i.e. the data sector is larger than a size of a data wedge). As illustrated in FIG. 3, each data sector 146 will likely span across or contain more than one data wedge 150 and more than one servo wedge 148. This is called a data sector having a split. As illustrated in FIG. 3, each data sector 146 can also contain portions of a data wedge 150.

Figure 5:
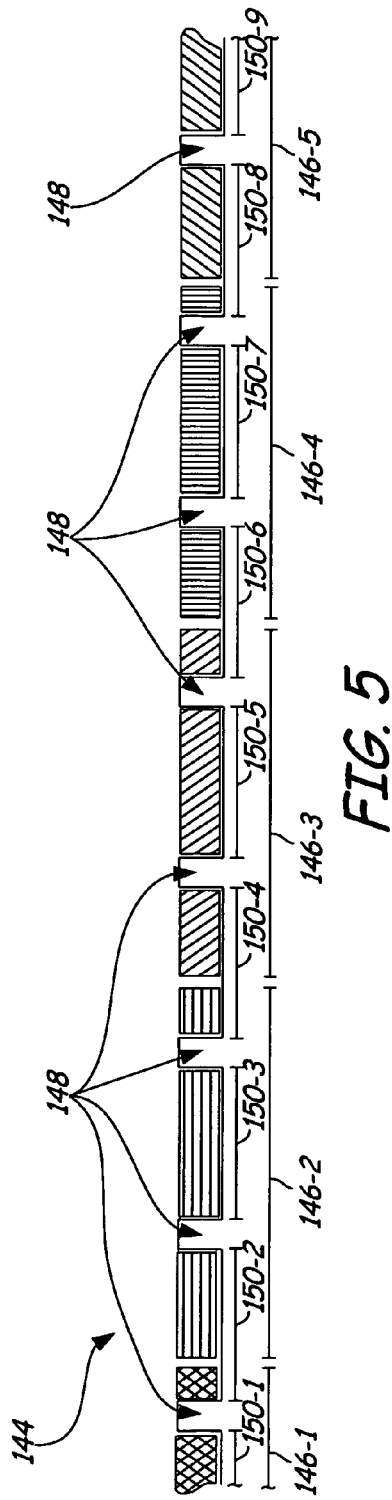
FIG. 5 illustrates a representation of a portion of the data track illustrated in FIG. 3.

FIG. 5 illustrates a representation of a portion of data track 144 illustrated in FIG. 3 if data track 144 were unwrapped into a single line. The portion of data track 144 that is illustrated includes a plurality of data sectors (146-1, 146-2, 146-3, 146-4 and 146-5), a plurality of servo wedges 148 and a plurality of data wedges (150-1, 150-2, 150-3, 150-4, 150-5, 150-6, 150-7, 150-8 and 150-9). FIG. 5 illustrates each data sector 146-1, 146-2, 146-3, 146-4 and 146-5 as having a split. A split results in a data sector spanning more than one data wedge, a data sector spanning more than one servo wedge and a data sector that includes portions of data wedges. As illustrated in FIG. 5, data sector 146-2 includes a portion of data wedge 150-2, data wedge 150-3, a portion of data wedge 150-4 and two sector wedges 148. Data sector 146-3 includes a portion of data wedge 150-4, data wedge 150-5, a portion of data wedge 150-6 and two sector wedges 148. Data sector 146-4 includes a portion of data wedge 150-6, data wedge 150-7, a portion of data wedge 150-8 and two sector wedges 148.

Figure 6:
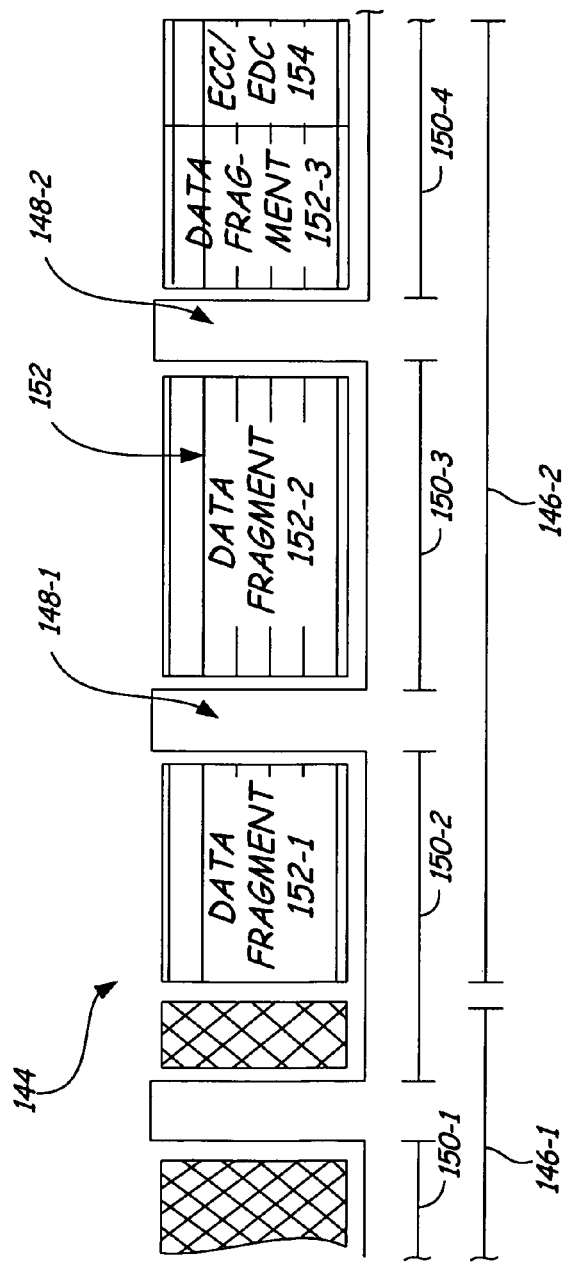
FIG. 6 illustrates a more detailed representation of the data track illustrated in FIG. 4.

FIG. 6 illustrates a more detailed representation of a portion of data track 144 illustrated in FIG. 5. In FIG. 6, data sector 146-2 includes a portion of data wedge 150-2, data wedge 150-3, a portion of data wedge 150-4, sector wedge 148-1 and sector wedge 148-2. As illustrated, data sector 146-2 includes data 152 and error correction data 154 as previously illustrated in FIG. 4. In more detail, data sector 146-2 includes a first data fragment 152-1, a servo wedge 148-1, a second data fragment 152-2, a servo wedge 148-2, a third data fragment 152-3 and error correction data 154. First data fragment 152-1 occupies a portion of data wedge 150-2. Second data fragment 152-2 occupies the entire size of data wedge 150-3. Third data fragment 152-3 and error correction data 154 occupies a portion of data wedge 150-4.

To optimize the movement or reallocation of defective data sectors that have large sizes, the present invention includes a method of moving defective data on a data wedge basis versus a data sector basis. Every data track on medium 112 is allocated with spare data wedges instead of spare data sectors. In addition, the movement of data is accomplished by applying a slip on the data track at the point where a defective data wedge of a data sector is found.

Figure 7:
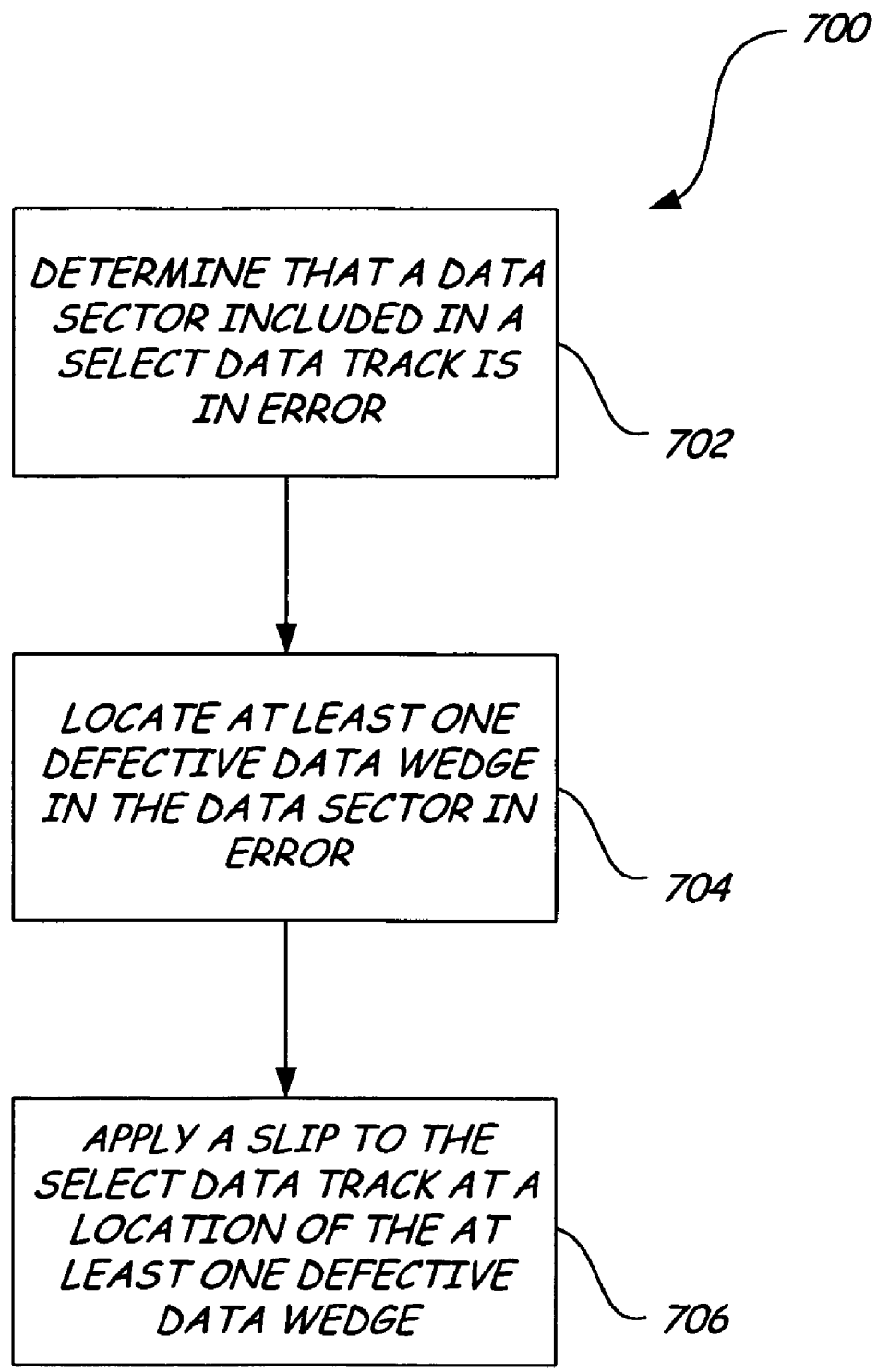
FIG. 7 is a simplified flowchart illustrating a method of moving data in a data storage system.

FIG. 7 illustrates a simplified flowchart 700 of a method of reallocating data in accordance with embodiments of the present invention. The method of FIG. 7 will be described in combination with the data track representations in FIGS. 5 and 6 and is performed by processing circuitry 134 of FIG. 2. At block 702, it is determined that a data sector 146-2 in a select data track 144 is in error. The data sector in error 146-2 includes at least one identified data wedge 150-2, 150-3 and 150-4. At block 704, at least one defective data wedge 150-2 in data sector 146-2 is located. At block 706, by utilizing at least one spare wedge on the select data track 144, the at least one defective data wedge 150-2 is moved to that spare wedge.

Figure 8:
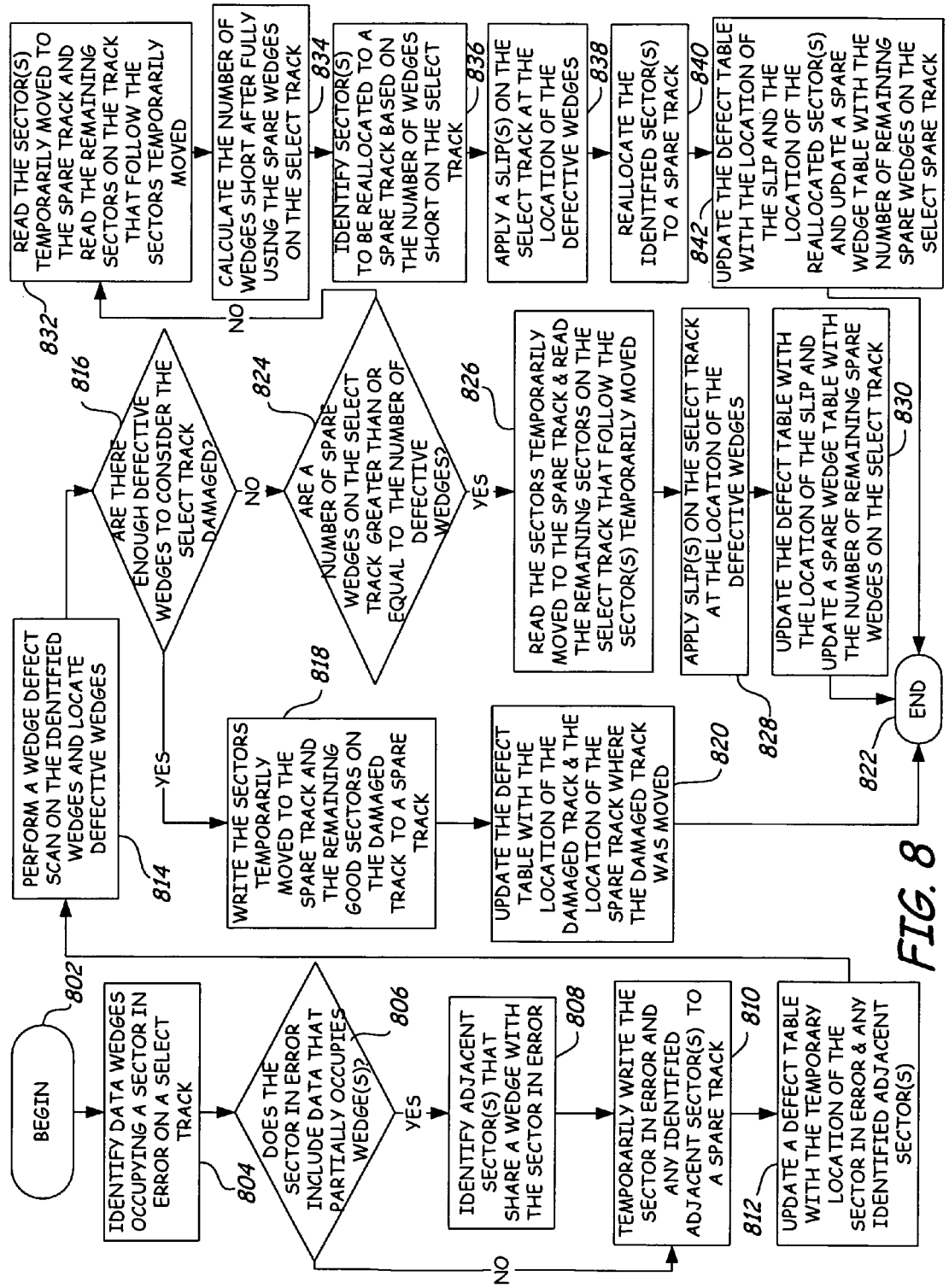
FIG. 8 is a more detailed flowchart illustrating the method of moving data in a data storage system that was simply illustrated in FIG. 7.

FIG. 8 illustrates a more detailed flowchart 800 of the method of moving data in accordance with embodiments of the present invention. Flowchart 800 illustrates a more detailed description of the method illustrated in FIG. 7. The method of FIG. 8 is described in combination with data track representations in FIGS. 5 and 6 and is performed by processing circuitry 134 of FIG. 2. At block 802, the method of moving data begins. At block 804, data wedges 150-2, 150-3, and 150-4 are identified as occupying data sector 146-2 that is in error on select data track 144. At block 806, it is determined whether the data sector in error 146-2 includes data that only partially occupies at least one of the identified data wedges 150-2, 150-3 and 150-4. If data of data sector 146-2 partially occupies at least one of the identified data wedges, then the method proceeds to block 808. If data of data sector 146-2 does not partially occupy at least one of the identified data wedges, then the method proceeds to block 810. At block 808, the method identifies adjacent data sectors that data sector 146-2 shares a data wedge with. Data sector 146-2 shares data wedge 150-2 with data sector 146-1 and shares data wedge 150-4 with data sector 146-3. After adjacent data sectors that share data wedges with data sector 146-2 are identified, the method proceeds to block 810.

At block 810, data sector 146-2 and any adjacent data sectors that were identified as sharing data wedges with data sector 146-2 in block 808 are temporarily written to a spare track. Therefore, data sectors 146-1, 146-2 and 146-3 are temporarily written to a spare track in medium 112. At block 812, a defect table is updated that includes the temporary location of data sector 146-2 and any adjacent data sectors 146-1 and 146-3 that were identified as sharing a data wedge with select data sector 146-2. At block 814, a wedge defect scan is performed on data wedges 150-2, 150-3 and 150-4 that were identified in block 804 as occupying data sector 146-2. Defective data wedge(s) from the scan are located. For example, data wedge 150-3 can be found as being defective.

At block 816, it is determined whether there are enough defective wedges to consider select data track 144 as being damaged. If there is enough defective data wedges to deem select data track 144 as being damaged, then the method proceeds to block 818. At block 818, the data sectors 146-1, 146-2 and 146-3 that were temporarily moved to a spare track and the remaining data sector on the select data track that were deemed damaged are written to a spare track. At block 820, the defect table is updated with the location of the moved data sectors of the select data track and the location of the spare track where the data track was moved. After block 820, the method ends at block 822.

Figure 9:
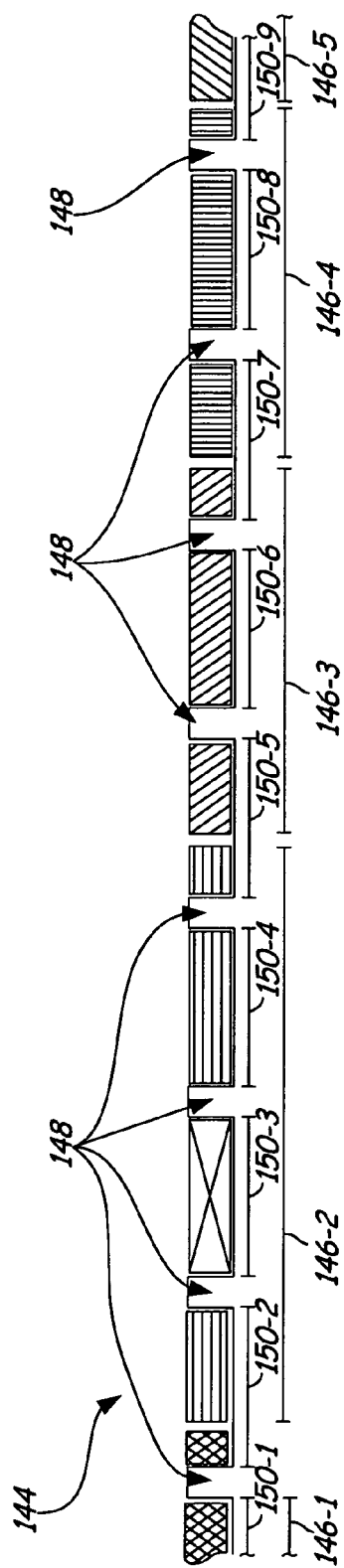
FIG. 9 is an example illustration of applying a slip to a select data track when there is enough spare data wedges in the select data track.

If there are not enough defective data wedges to deem select data track 144 as being damaged, then the method proceeds to block 824 from block 816. At block 824, it is determined whether a number of spare wedges on select data track 144 is greater than or equal to the number of defective data wedges. If the number of spare data wedges on select data track 144 are greater than or equal to the number of defective wedges, then the method proceeds to block 826. At block 826, the data sectors 146-1, 146-2 and 146-3 that were temporarily moved to the spare track are read and the remaining data sectors (e.g. data sector 146-5) on select data track 144 that follow the data sectors temporarily moved are read. At block 828, a slip is applied on select data track 144 at a location of the defective data wedge(s). For example, if the scan described in relation to block 814 locates data wedge 150-3 as being defective, then a slip is applied to select data track 144 at data wedge 150-3. Applying a slip at data wedge 150-3 includes the process of moving data in defective data wedge 150-3 and all remaining data wedges (e.g. data wedges 150-4, 150-5, 150-6, 150-7, 150-8, 150-9 and etc.) in select data track 144 that follow defective data wedge 150-3 towards the spare data wedges on select data track 144. Defective data wedge 150-3 is then marked as unusable. The resultant select data track 144 after the slip at data wedge 150-3 is illustrated in FIG. 9. At block 830, the defect table is updated with the location of the slip and a spare wedge table is updated with the number of remaining spare wedges on select track 144. After block 830, the method ends at block 822.

If the number of spare data wedges on select data track 144 are less than the number of defective wedges, then the method proceeds to block 832. At block 832, the data sectors 146-1, 146-2 and 146-3 that were temporarily moved to the spare track are read and the remaining data sectors (e.g. data sector 146-5) on select data track 144 that follow the data sectors temporarily moved are read. At block 834, a number of spare data wedges that select data track 144 is short after fully using the spare wedges on select track 144 are calculated. For example, if the scan in block 814 found that data wedge 150-3 is defective and that there were no spare data wedges available on select data track 144, then the number of spare data wedges short is one and a data sector from data track 144 is going to have to be moved to a spare track in order to perform a slip on data track 144.

Figures 1, 10:
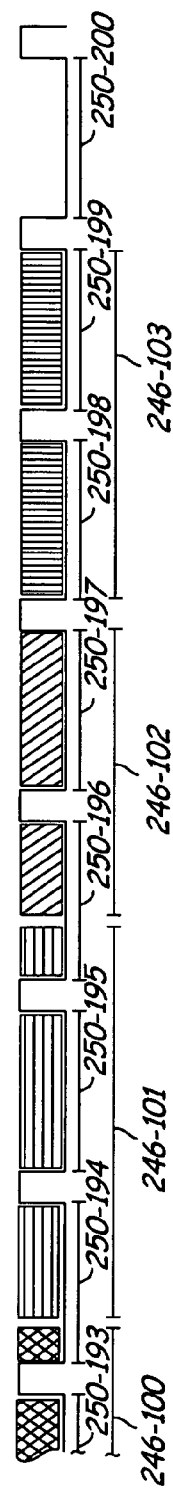
FIG. 10 is an example illustration of applying a slip to a select data track when there is not enough spare data wedges in the select data track.
Figures 2, 10:
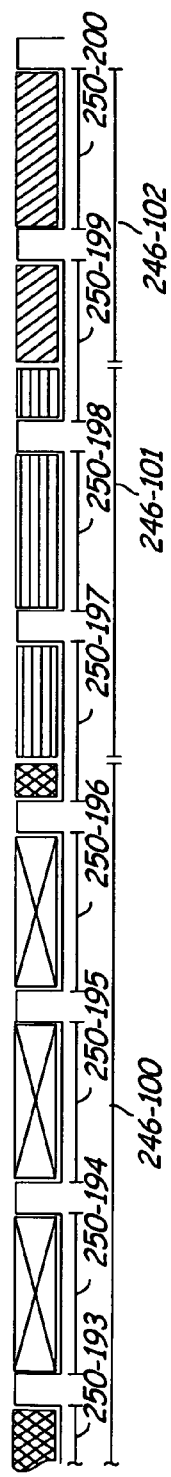

At block 836, the data sector(s) to be moved to a spare track are identified based on the number of spare data wedges short on select data track 144. The data sector(s) that are identified as needing to be moved to a spare track are those data sectors that are towards the end of track 144. FIGS. 10-1 and 10-2 illustrate an example of an identified data sector that needs to be moved. In FIG. 10-1, a data track 244 includes 103 data sectors. Data sector 246-100 is a partial view of the $100^{th}$ data sector of data track 244 and has a plurality of data wedges including illustrated data wedge 250-193 and a portion of data wedge 250-194. Data sector 246-101 is the $101^{st}$ data sector of data track 244 and includes the remaining portion of data wedge 250-194, data wedge 250-195 and a portion of data wedge 250-196. Data sector 246-102 is the $102^{nd}$ data sector of data track 244 and includes the remaining portion of data wedge 250-196 and data wedge 250-197. Data sector 246-103 is the $103^{rd}$ data sector of data track 244 and includes data wedges 250-198 and 250-199. Data track 244 includes one spare data wedge 250-8. In this example, it is found that data track 244 includes three defective data wedges based on the scan performed in block 814 of FIG. 8. The three defective data wedges are included in data sector 246-101 and a portion of data sector 246-102. The three defective data wedges are data wedges 250-194, 250-195 and 250-196. In this example, at block 836 of FIG. 8, data sector 246-103 is identified as needing to be moved to a spare data track in order to perform a slip at the three defective data wedges on data track 244.

At block 838, a slip is performed at a location of the three defective data wedges on data track 244. Applying a slip at the three defective data wedges includes the process of moving data in the three defective data wedges and all remaining data wedges (e.g. data wedges 250-197 through 250-199) that follow the defective data wedges towards the spare data wedge 250-200. The defective data wedges 250-194, 250-195 and 250-196 are then marked as unusable. At block 840, the identified data sector 246-103 that has to be moved to a spare track is moved because there are no more spare data wedges in data track 244. The resultant data track 244, after the slip at the defective data wedges and the movement of data sector 246-103, is illustrated in FIG. 10-2. As illustrated in FIG. 10-2, data sectors 246-101 and 246-102 were moved towards the spare wedge. At block 842, the defect table is updated with the location of the slip and the location of the moved data sector 246-103. The spare wedge table is updated with the number of remaining spare wedges on track 244. In the example illustrated in FIGS. 10-1 and 10-2, data sector 246-103 occupied two data wedges and there was one spare data wedge on data track 244. Therefore, the spare wedge table will show no available spare wedges for track 244. After block 842, the method ends at block 822.

Although it is not illustrated in the above example, it is possible that by moving data sector(s) to a spare track, a slip may not require the full amount of available data wedges on the data track. In such an instance, left over data wedges are converted to spare wedges and the available amount of spare wedges is updated in the spare wedge table.

Figures 11, 12:
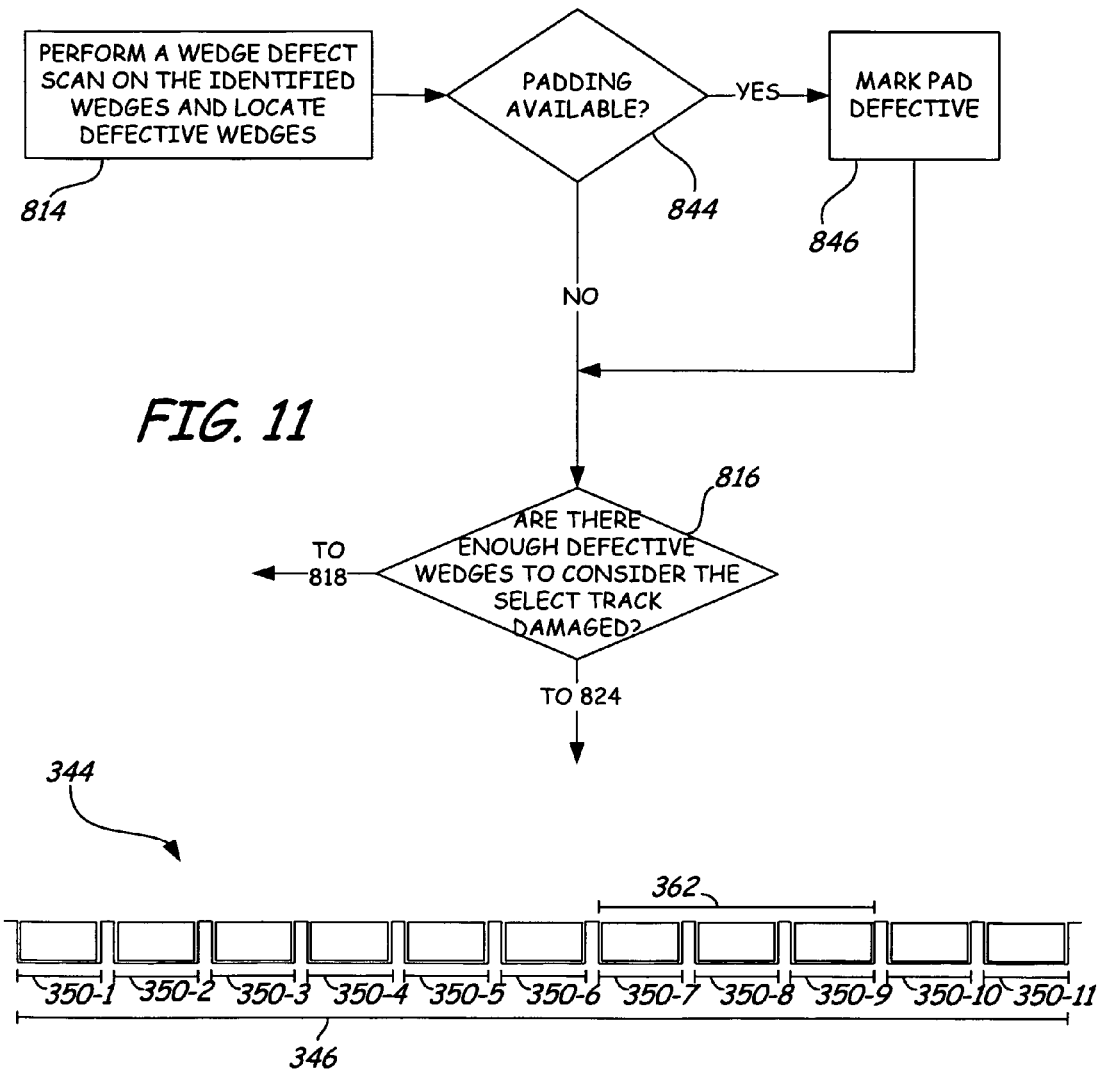
FIG. 11 illustrates a portion of a flowchart illustrating an alternative option for the method of moving data in a data storage system.
FIG. 12 is an example illustration of marking a pad as defective.

In other embodiments of the present invention, the method illustrated in FIG. 8 can include an alternative set of steps as illustrated in FIG. 11. In FIG. 11, instead of the method proceeding from block 814 to block 816 as illustrated in FIG. 8, the method proceeds from block 814 to block 844. At block 844, it is determined whether the locations of defective data wedges located in block 814 are available for padding. If padding for the defective data wedges is available, then the method proceeds to block 846. FIG. 12 illustrates an example of padding defective data wedges. A select data track 344 includes a data sector 346 that is in error. Data sector 346 spans data wedges 350-1 through 350-11. If data wedges 350-7 and 350-9 are found as defective wedges during the scan performed in block 814, then at block 846, the method marks data wedges 350-7, 350-8 and 350-9 as a defective pad 362. Defects can easily merge and grow together. Therefore, marking pad 362 or block of data wedges 350-7, 350-8 and 350-9 is a precautionary step because the potential for data wedge 350-8 to eventually become defective is high. After marking pad 362 including data wedges 350-7, 350-8 and 350-9 as defective, then the method passes to block 816 such that a slip is performed at a location of defective pad 362 at either block 828 or block 838. If padding for the defective wedges is unavailable, then the method proceeds directly from block 844 to block 816. For example, referring to FIG. 12, if data wedge 350-1 is found to be defective and data wedge 350-10 is found to be defective, then it would be inefficient to mark all data wedges between data wedges 350-1 and 350-10 as a defective pad since the likelihood that the defects would grow together is low because they are spaced far apart from each other. Therefore, in this example, padding is unavailable.

When applying a slip at either block 828 or block 838, the method of moving can also mark the surrounding area of a defect as defective. By marking the surrounding area of a defect, the surrounding area is prevented from being used for data. As previously discussed, there is the potential that a defect can grow into adjacent data wedges or data sectors. Both padding and marking a surrounding area as defective ensures a high level of data integrity.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a medium for a data storage system, it will be appreciated by those skilled in the art that the teachings of the present invention can be applied to other types of storage mediums, without departing from the scope and spirit of the present invention.

What is claimed is:

1. A method comprising:
   determining that a data sector included in a select data track is in error;
   identifying each data wedge that occupies the data sector in error;
   determining that the data sector in error includes at least one data wedge that is shared with at least one adjacent data sector;
   identifying the at least one adjacent data sector that includes at least one shared data wedge with the data sector in error;
   locating at least a first defective data wedge and a second defective data wedge from the data sector in error and from the at least one adjacent data sector that shares a data wedge with the data sector in error;
   marking the first defective data wedge, the second defective data wedge and any data wedges therebetween as a defective pad; and
   moving each defective data wedge by utilizing at least one spare wedge on the select data track.

2. The method of claim 1, further comprising:
   temporarily writing the data sector in error and any adjacent data sector that shares a data wedge with the data sector in error to a spare track; and
   updating a defect table with the temporary location of the data sector in error and any adjacent data sector that shares a data wedge with the data sector in error.

3. The method of claim 1, wherein moving each defective data wedge comprises applying a slip to the select data track at a location of each defective data wedge.

4. The method of claim 3, further comprising determining that an available amount of spare wedges in the select data track is at least as great as the amount of defective wedges in the data sector in error prior to applying a slip to the select data track.

5. The method of claim 4, further comprising reading the data sector in error and remaining data sectors on the select data track that follow the data sector in error.

6. The method of claim 5, further comprising:
   updating a defect table with a location of the slip after applying the slip; and
   updating a spare wedge table with an amount of remaining spare wedges on the select data track after applying the slip.

7. The method of claim 3, further comprising determining that an available amount of spare wedges in the select data track is less than the amount of defective wedges in the data sector in error prior to applying the slip to the select data track.

8. The method of claim 7, further comprising reading the data sector in error and remaining data sectors on the select data track that follow the data sector in error.

9. The method of claim 7, further comprising:
calculating an amount of additional spare data wedges needed to apply the slip;
identifying select remaining data sectors on the select data track to be reallocated to a spare track based on the amount of additional spare data wedges needed to apply the slip; and
reallocating the identified select remaining data sectors on the select data track to a spare track.

10. The method of claim 9, further comprising:
updating a defect table with a location of the slip after applying the slip; and
updating a spare wedge table with an amount of remaining spare wedges on the select data track after applying the slip.

11. The method of claim 3, wherein applying the slip to the select data track at the location of the at least one defective data wedge comprises applying the slip to the select data track at a location of the defective pad.

12. A system comprising:
a storage medium including data tracks that are configured to store data in data wedges that occupy data sectors;
processing circuitry configured to:
determine that a data sector included in a select data track is in error;
identify each data wedge that occupies the data sector in error;
determine that the data sector in error includes at least one data wedge that is shared with at least one adjacent data sector;
identify the at least one adjacent data sector that includes at least one shared data wedge with the data sector in error;
locate at least a first defective data wedge and a second defective data wedge from the data sector in error and from the at least one adjacent data sector that shares a data wedge with the data sector in error;
wedge, the second defective data wedge and any data wedges therebetween as a defective pad; and
move each defective data wedge by utilizing at least one spare wedge on the select data track.

13. The system of claim 12, wherein the processing circuitry is configured to move each defective data wedge by applying a slip to the select data track at a location of each defective data wedge.

14. The system of claim 13, wherein the processing circuitry is further configured to determine that an available amount of spare wedges in the select data track is less than the amount of defective wedges in the data sector in error prior to applying the slip to the select data track.

15. The system of claim 14, wherein the processing circuitry is further configured to:
calculate an amount of additional spare data wedges needed to apply the slip;
identify select remaining data sectors on the select data track to be reallocated to a spare track based on the amount of additional spare data wedges needed to apply the slip; and
move the identified select remaining data sectors on the select data track to a spare track.

16. The system of claim 15, wherein the processing circuitry is further configured to:
update a defect table with a location of the slip after applying the slip; and
update a spare wedge table with an amount of remaining spare wedges on the select data track after applying the slip.

* * * * *